June 19, 1934.  L. HEIDMANN  1,963,268

ELECTRIC MOTOR CONTROL

Filed Nov. 12, 1930

Inventor:
Leon Heidmann
By
Pennie Davis Marvin & Edmonds
attorneys

Patented June 19, 1934

1,963,268

UNITED STATES PATENT OFFICE 1,963,268

ELECTRIC MOTOR CONTROL

Leon Heidmann, Paris, France, assignor to Forges & Ateliers de Constructions Electriques De Jeumont, Société Anonyme, Paris, France, a French joint-stock company Application November 12, 1930, Serial No. 495,113 In France November 15, 1929

2 Claims. (Cl. 172—179)

This invention relates to electric motors and more particularly to a method of connecting commutator motors for allowing an instantaneous change over from normal working to braking.

When a mechanism driven by an electric motor has to be stopped quickly, it is advantageous to utilize the driving motor as a brake, the motor then operating as a series generator supplying current either to a resistance or in short circuit. However this change over in the function of the motor calls for a modification of the connections between the armature and the field coils and for a self-excitation of the generator, which alterations require a certain time and are therefore an obstacle to the instantaneous effect of the brake operation.

The method of electric motor connection forming the subject of the present invention has for its object to avoid this loss of time by bringing about the braking effect immediately as soon as the supply current fed to the motor is cut off.

This advantage is very important when the motor drives a mechanism which it is required to hold fast in exactly determined positions or at precise moments.

The invention consists in an electric control system for a commutator motor, the field coils of which are dimensioned in such a way that they admit a current of the same order of magnitude as the armature current, as in the case of the field coils of a series wound motor, this control system allowing of passing instantaneously from shunt motor operation to series generator operation, even after only a very small movement of the motor; with this object in view, the control system further comprises a switch in the armature circuit and electromagnetic means for closing said switch by the current in the field coils, so that at the starting of the motor the armature does not receive current until the magnetic flux is established in the field and the full power for regenerative braking is therefore available so soon as required.

Upon the accompanying drawing, to which reference is made in the subsequent description:—

Upon these two figures, the same reference numerals designate the same parts.

1 is the motor armature; 2 is an inductor or field circuit.

The whole is fed between the positive and negative poles of the supply, which is assumed to be direct current, by means of a switch 3 and if desired a fixed or variable resistance 4. The arrows represent the direction of the current in the field coil 2 and of the back electromotive force in the armature 1.

The motor being at work, if the current is cut off, for example by opening the switch 3, the back electromotive force of the armature 1, which continues to revolve by reason of its momentum, maintains in the field coil 2 a current in the same direction as the normal working current; the connections are thus established for series generator working, in short circuit, and on the other hand this generator working receives its excitation without any delay because the current and the flux are pre-existent in the field coil 2 and in its magnet system at the very moment when the driving torque disappears.

The braking torque can be regulated to such a value as may be desired, according to the speed of the motor, by suitably dimensioning the field windings. A resistance can likewise be interposed in the circuit traversed by the current of the motor now operating as a generator.

This system or method of connection may be found ineffective when the stopping of the motor is brought about so soon after the starting up that the flux of the field magnets has not had time to reach a sufficient value. In this case, in effect, the speed of the motor may be greater than normal by reason of the under-excitation, and on the other hand the braking torque is low because the flux of the field magnets has not yet attained its normal value.

Figure 1:
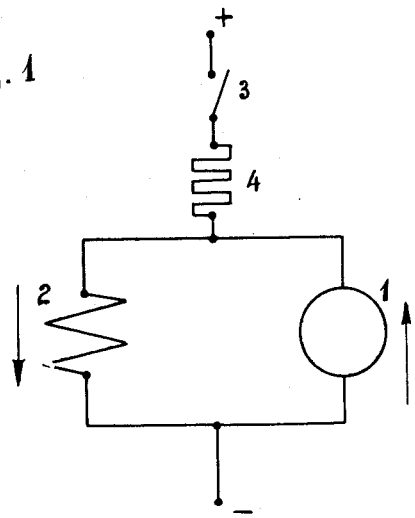
Figure 1 represents by way of example the diagram of connections of a motor arranged in accordance with the invention.
Figure 2:
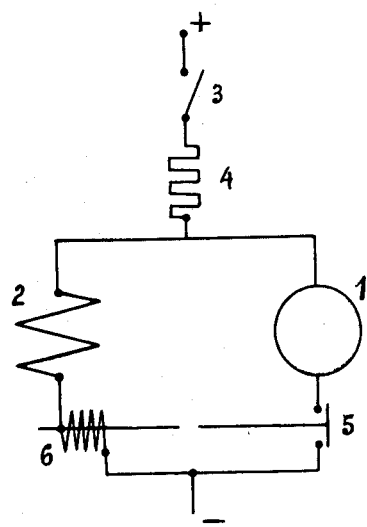
Figure 2 shows the same motor having a special contactor switch inserted in its circuit.

This drawback can be obviated by admitting current to the armature only when it has been established in the field coils. For this purpose there can be employed for example a contactor switch 5, such as represented in Figure 2, the energizing coil 6 of which is excited by the field current.

It will be understood that the contactor 5 remains open so long as the field current has not attained a sufficient value.

The system or method of electric connection forming the subject matter of the invention involves fairly high losses in the field circuit and therefore provides a motor of low efficiency. However its application remains nevertheless of considerable utility whenever the consideration of efficiency is of minor importance, as in the case particularly of servo-motors utilized for the precise operation of mechanisms.

In this order of ideas the present invention is particularly applicable to the system of step by step operation for electric switches described in the specification of my prior Patent No. 1,839,312, for obtaining instantaneously the progressive braking referred to therein.

What I claim is:—

1. The combination of a commutator motor adapted for instantaneous change from normal running to electric braking, with an electromagnetic switch having an operating coil and adapted to prevent the starting of said motor before the establishment of the full field flux necessary for electric braking, said motor having its armature and the whole of the field coils permanently connected together on one pole and connectible together on another pole by the operation of said electromagnetic switch, said electromagnetic switch having its operating coil connected in series with said field coils between said poles.

2. The combination of a commutator motor having an armature and field coils, the whole of said field coils being connected in shunt to said armature for normal running, said field coils being connectible to form a series circuit with said armature for electric braking purposes; with a control switch for supplying current to said motor for normal running and for cutting off the current supply leaving said armature and the whole of field coils in series circuit connection, and electro-magnetic means for controlling the supply of current from said control switch to said armature, said electromagnetic means being energized for passing current through said armature upon the establishment of the field flux necessary for electric braking.

LEON HEIDMANN.